United States Patent [19]

Chisum

[11] E Patent Number: Re. 31,636

[45] Reissued Date of Patent: Jul. 31, 1984

[54] AUTO BODY AND FRAME STRAIGHTENING DEVICE

[76] Inventor: Finis L. Chisum, Box 1145, Claremore, Okla.

[21] Appl. No.: 718,601

[22] Filed: Aug. 30, 1976

Related U.S. Patent Documents

Reissue of:

[64] Patent No.: 3,888,100
Issued: Jun. 10, 1975
Appl. No.: 211,527
Filed: Dec. 23, 1971

U.S. Applications:

[63] Continuation-in-part of Ser. No. 810,940, Mar. 27, 1969, Pat. No. 3,630,066.

[51] Int. Cl.[3] ..... B21D 1/12

[52] U.S. Cl. ..... 72/305; 72/705

[58] Field of Search ..... 72/705; 14/73; 52/808, 52/785

[56] References Cited

U.S. PATENT DOCUMENTS

| | | | |
|---|---|---|---|
| 2,165,846 | 7/1939 | Gaisman | 52/808 |
| 2,563,527 | 8/1951 | Gingrich et al. | 72/705 |
| 2,674,293 | 4/1954 | Elam | 72/705 |
| 2,705,040 | 3/1955 | Howick | 72/705 |
| 2,717,020 | 9/1955 | Dobias | 72/705 |
| 2,792,046 | 5/1957 | Fagan | 72/705 |
| 3,088,513 | 5/1963 | Marquardt | 72/705 |
| 3,122,194 | 2/1964 | Bronson et al. | 72/705 |
| 3,253,288 | 5/1966 | Nagin | 14/73 |
| 3,269,169 | 8/1966 | Latuff et al. | 72/705 |
| 3,338,083 | 8/1967 | Eck | 72/705 |
| 3,340,720 | 9/1967 | Chartier | 72/705 |
| 3,377,834 | 4/1968 | Latuff et al. | 72/705 |
| 3,518,867 | 7/1970 | Rouis | 72/705 |
| 3,581,547 | 6/1971 | Estigarribia | 72/705 |
| 3,626,747 | 12/1971 | Rouis | 72/705 |
| 3,630,066 | 12/1971 | Chisum | 72/705 |
| 3,729,978 | 5/1973 | Lunardini | 72/705 |

FOREIGN PATENT DOCUMENTS

| | | | |
|---|---|---|---|
| 249933 | 10/1963 | Australia | 72/705 |
| 754521 | 1/1971 | Belgium . | |
| 697873 | 11/1964 | Canada | 72/705 |
| 944671 | 4/1974 | Canada . | |
| 624074 | 8/1961 | Italy | 254/134.3 R |
| 1154942 | 6/1969 | United Kingdom . | |

*Primary Examiner*—Lowell A. Larson
*Attorney, Agent, or Firm*—Head, Johnson & Stevenson

[57] ABSTRACT

Apparatus is provided to apply pulling forces from any direction from any elevation around a vehicle being repaired and/or serviced. The apparatus is arranged so personnel using it are concerned with minimal physical lifting movements and minimal setup arrangements of the apparatus. Each embodiment of the apparatus utilizes at least one tower assembly equipped with an elongating subassembly to move a tension member, through directional change devices, as it remains secured to some portion of a vehicle, thereby undergoing at least one repositioning pull in a direction opposite to at least one prior force that previously caused some of the damage and/or misalignment. Depending on the magnitude of the restoring force required, the tower, other towers, and/or other structures may be secured together and/or to the vehicle as well, to create a firm basis for anchoring the apparatus and/or the vehicle as one or more reactive forces are controllably created. Depending on the anticipated use of the apparatus and the capital expenditures to be made, the apparatus is made available in different embodiments, ranging from a sole location of a tower to multiple locations of several towers related to overall reactive structures and/or vehicle ramps serving as mutual multiple holding or anchoring places of forces applied to the vehicle, as the elongating subassemblies of the towers are moved to create the restorative pulling forces.

16 Claims, 32 Drawing Figures

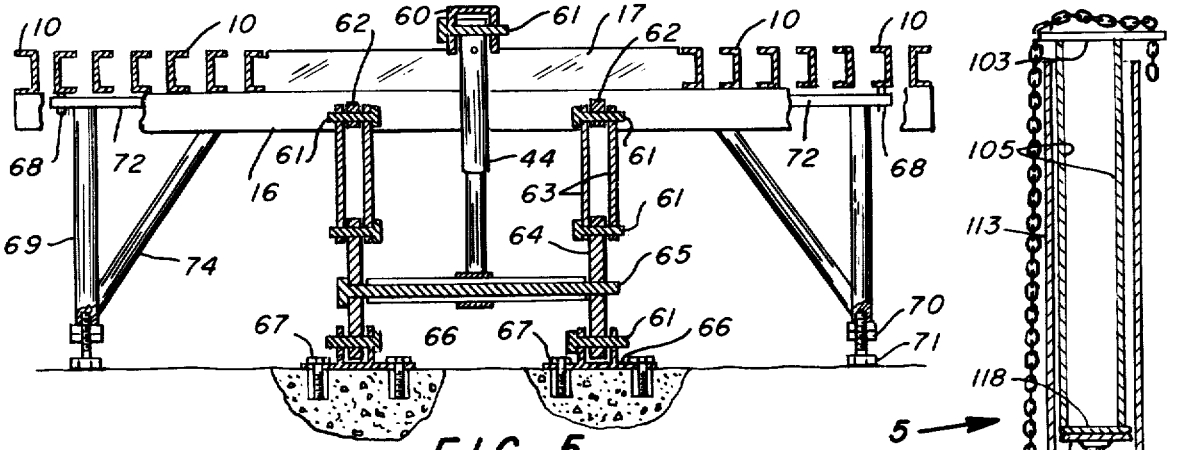
FIG. 5
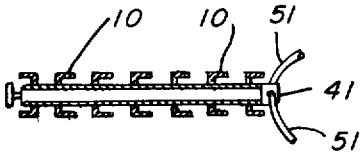
FIG. 5A
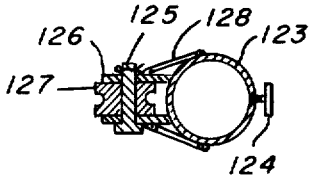
FIG. 4A
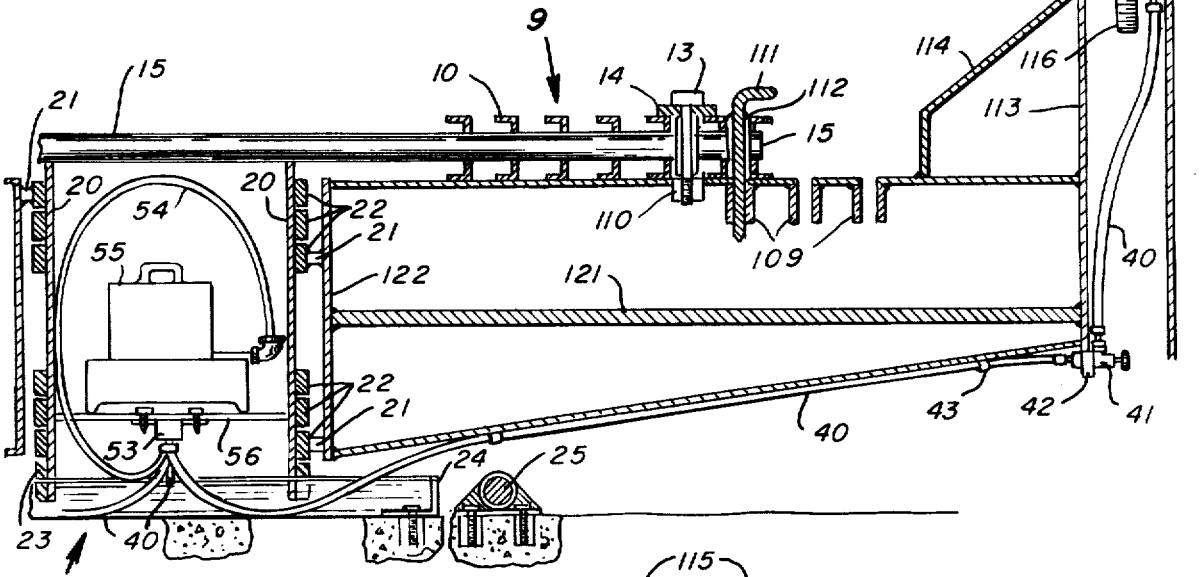
FIG. 4
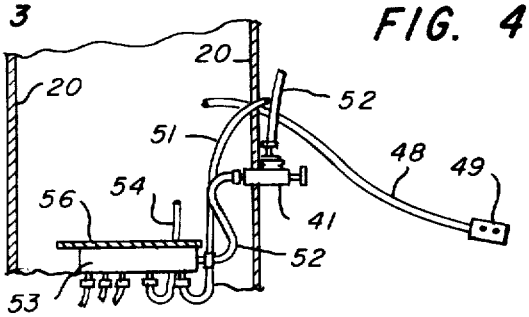
FIG. 4B
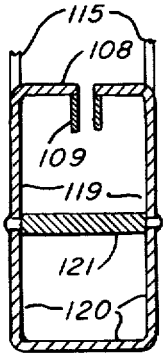
FIG. 4C
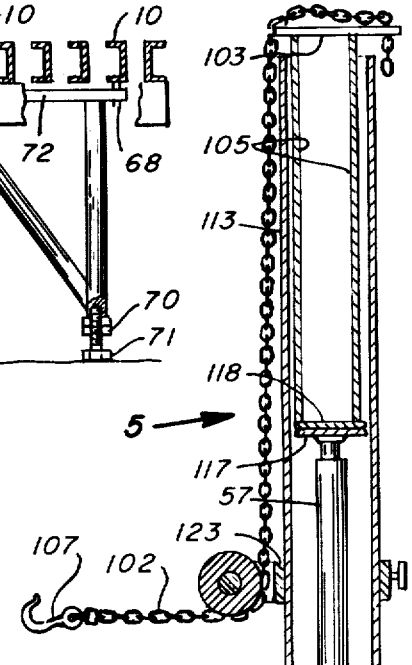

AUTO BODY AND FRAME STRAIGHTENING DEVICE

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of my copending application Ser. No. 810,940 filed: Mar. 27, 1969, now U.S. Pat. No. 3,630,066. This application further includes subject matter divided from said copending application.

BACKGROUND OF INVENTION

Present apparatus known to be available for correcting misalignment of vehicles and for returning frame and body members of vehicles back to their predamage locations, as such services are performed by personnel in body shops and other service and repair shops, are not conveniently set up and operated to meet the demands of personnel in various size repair shops. This invention is offered in multiple embodiments to meet different requirements of cost, convenience and service of many shops wherein personnel are seeking better apparatus to more economically perform their realignment and body repair services.

The apparatus known to be available prior to this invention, required personnel using it to make many lifts of heavy and/or awkward components under awkward footing and overhead conditions during time consuming setup periods. This was necessary to try to place components in various wanted positions, many not being directly obtainable, where the resulting pulling forces would be applied most advantageously to restore vehicle frames and bodies to their originally designed positions. Where prior attempts were made to obtain a greater range of pulling and anchoring locations, the resulting apparatus was often complex, large, costly, and inconvenient to manipulate, and moreover, often requiring special building configurations such as higher overhead space and/or floor pits.

In contrast, this invention, in its various embodiments, to be selected depending on the anticipated volume of such repairs to be undertaken and the capital funds available, is provided so personnel may conveniently and quickly arrange the apparatus to pull on a vehicle frame and/or body in the most advantageous direction at one or more locations. As business grows, the offered embodiments are conveniently and economically increased in capacity by acquiring components of other embodiments. Moreover at all times with respect to all personnel, straining, overtiring and dangerous situations are avoided.

SUMMARY

Apparatus for returning vehicle body and frame components to their original locations during repair and servicing of vehicles is provided in various embodiments, each centering on the use of one or more towers or pedestals including a length changing subassembly as the basis of creating a restorative force applied in a selected direction to return one or more vehicle components to their original designed relative location. The apparatus in all its embodiments: simplifies body and frame straightening operations; permits simple hookups for faster correction to damage at any point on a vehicle; reverses the damage sequencing of the wrecked car for a faster and more accurate body and/or frame correction; allows more freedom for workmen who do not have to move over or under any supporting beams or other structures; eliminates heavy lifting by personnel; pulls in any desired angular direction; fits in minimum amount of space; sets up in buildings with low ceilings; complies with equipment specifications presented by both small shop, medium and large shop operators; requires no pit but may be used in conjunction with one; needs no special surrounding building.

DRAWINGS OF PREFERRED EMBODIMENTS

FIG. 1, including location designations noted respectively as SUBSECTIONS A, B, C & D, is a side elevation, with some portions broken away for illustrative purposes, of a preferred embodiment of the apparatus being used to create restorative forces applied to the vehicle shown;

Figure 1:
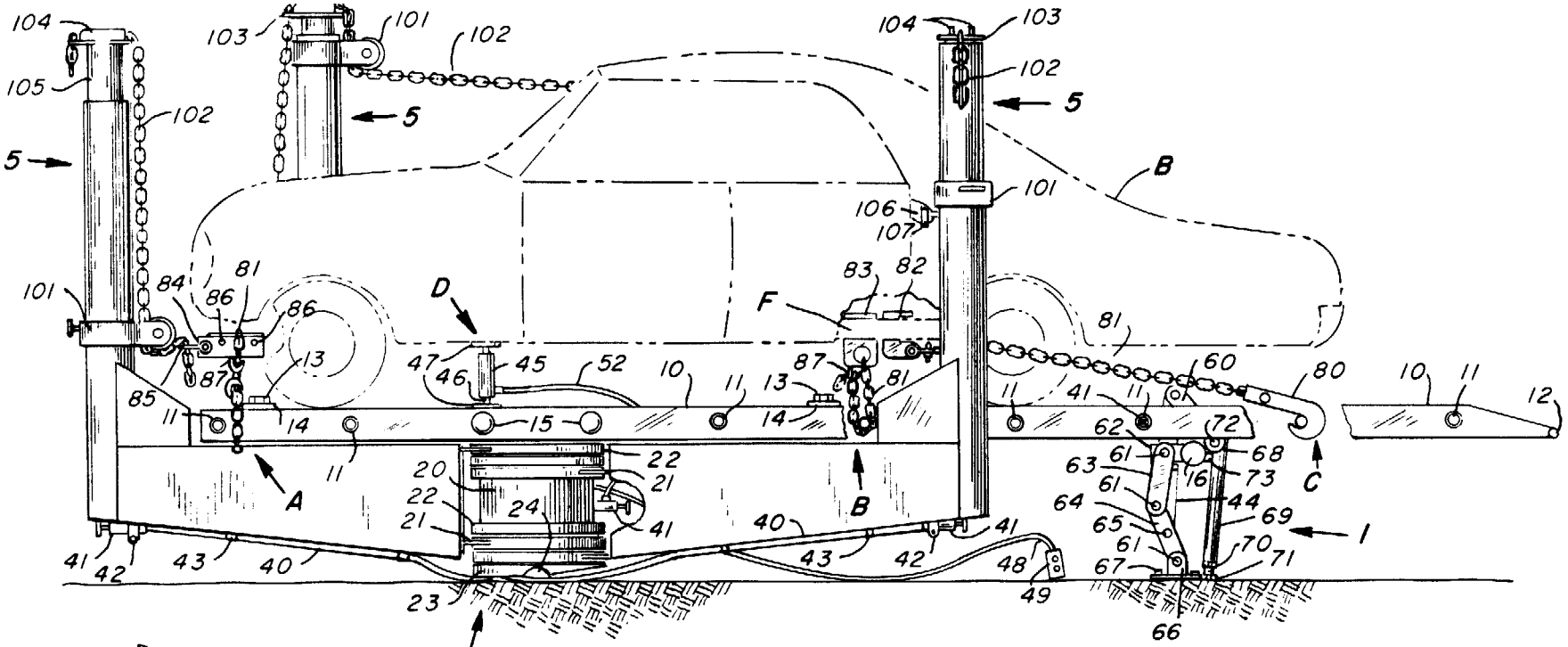
Figures 3, 3A, 3B, 3C:
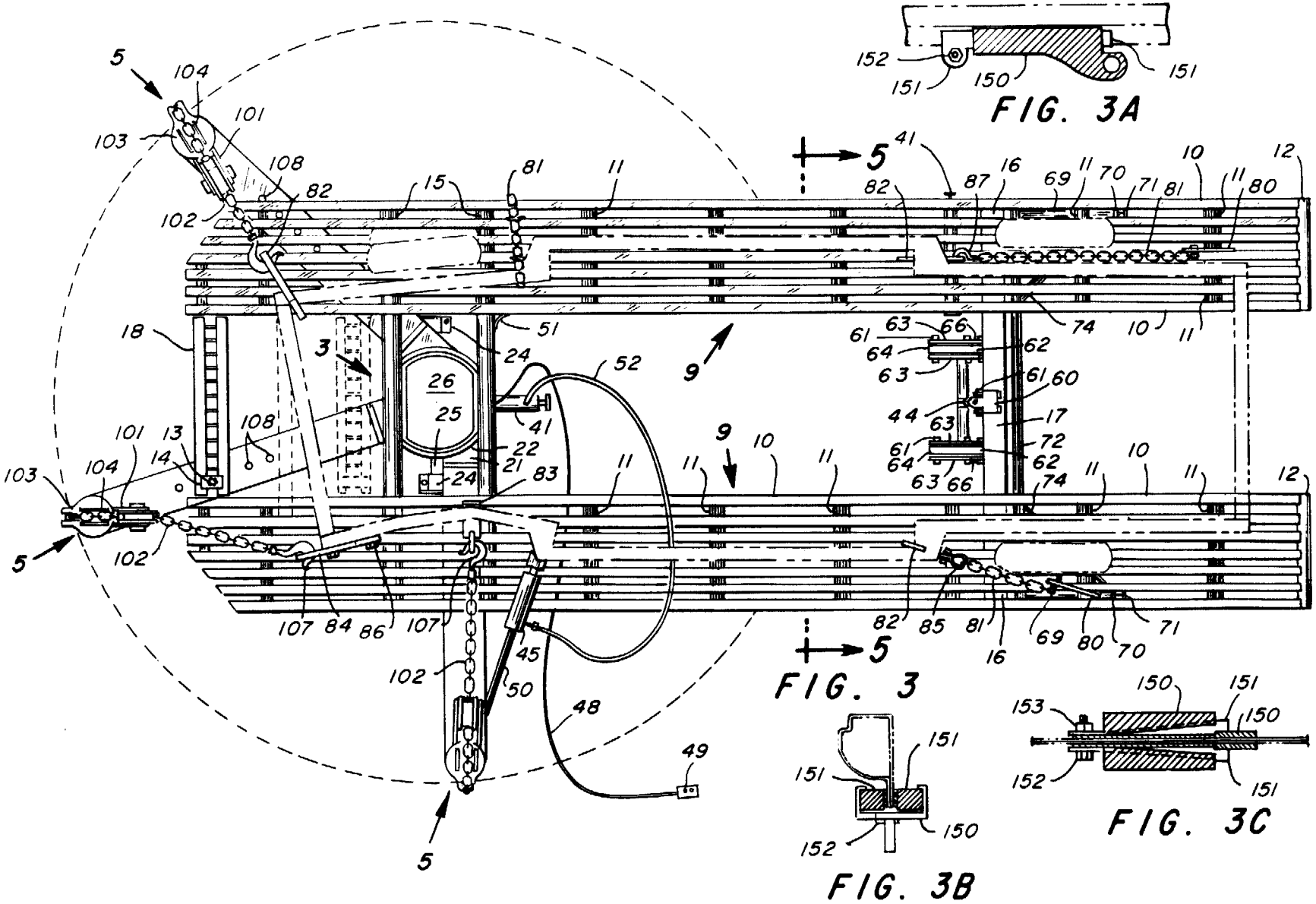
FIG. 3, is a top plan view of the embodiment shown in FIG. 1, indicating, however, only the placement of the frame and some of the wheels of a vehicle.

FIGS. 3A, 3B, and 3C, indicate partially sectioned respective side, end and top views, of a body gripping clamp used particularly where only body portions and not heavier frame portions are available to receive a restoring force;

FIG. 4, is a partial cross section view of the embodiment of FIG. 1 indicating structure, arrangement, and operation of apparatus with respect to one tower, its force creating accessorries and its multiposition attachment to other towers and their common attached supporting and servicing structures;

FIGS. 4A, 4B, and 4C, indicate partially sectioned views related specifically to FIG. 4 and more respectively to: adjustable height accessories secured to a tower and used in determining the elevation of a direct pulling force; some of the hydraulic accessories viewed at right angles with respect to their view in FIG. 4; and some of the cross section structure of the radially positioned beam or arm structure supporting the tower;

FIG. 5, is a view, primarily in section, taken along the lines 5—5 of FIG. 3, indicating the raised position of the rail or ramp subassemblies and both their actuating accessories and safety brace accessories, as all appear when a vehicle is lifted into a horizontal position for undergoing repairs;

FIG. 5A, is a partial sectional view related to FIG. 5, indicating how a control is located to operate hydraulic accessories used in raising the rails or ramps near or at their ends that are conveniently lowered to receive a vehicle and thereafter raised to position the vehicle horizontally while repairs are undertaken.

Figures 6, 7, 8, 9, 10:
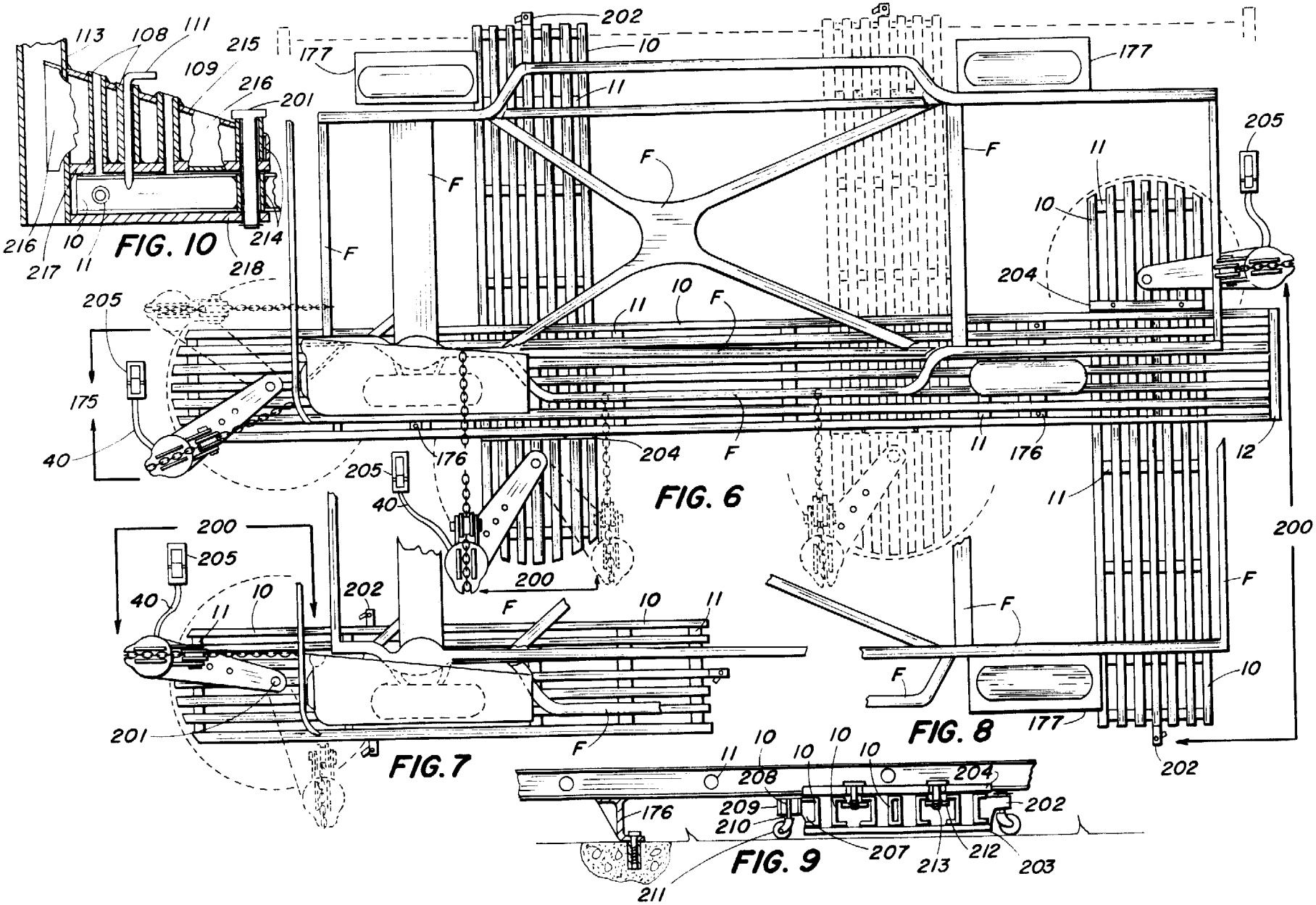
Figure 11:
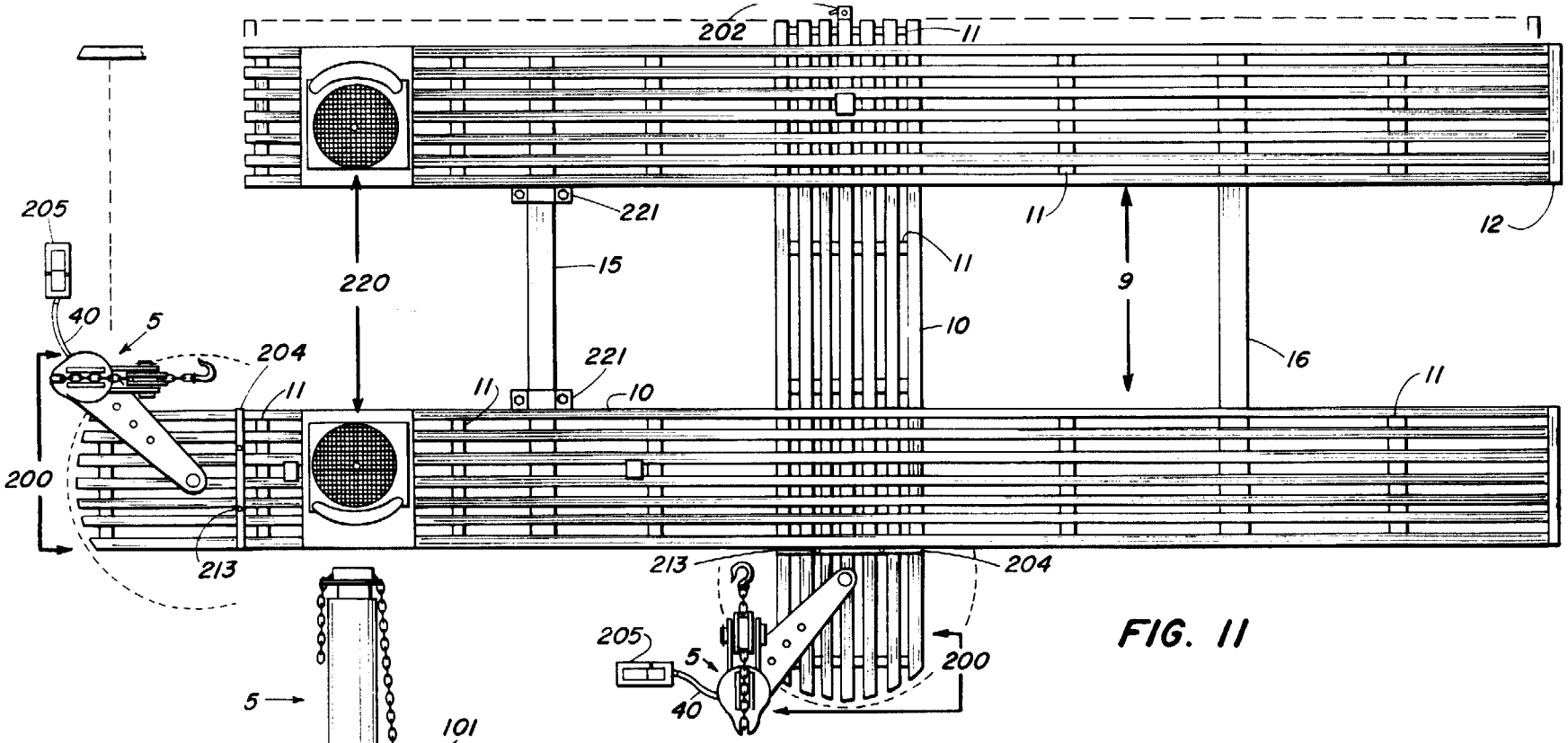
Figure 12:
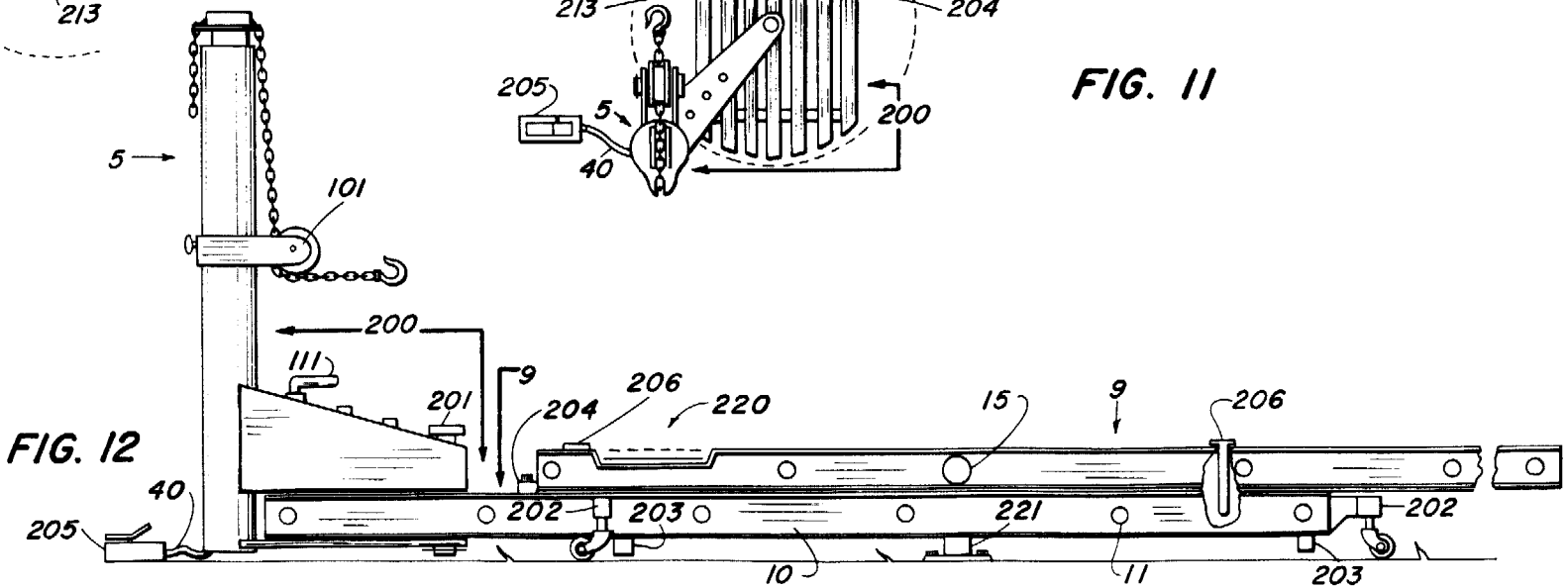
Figure 14:
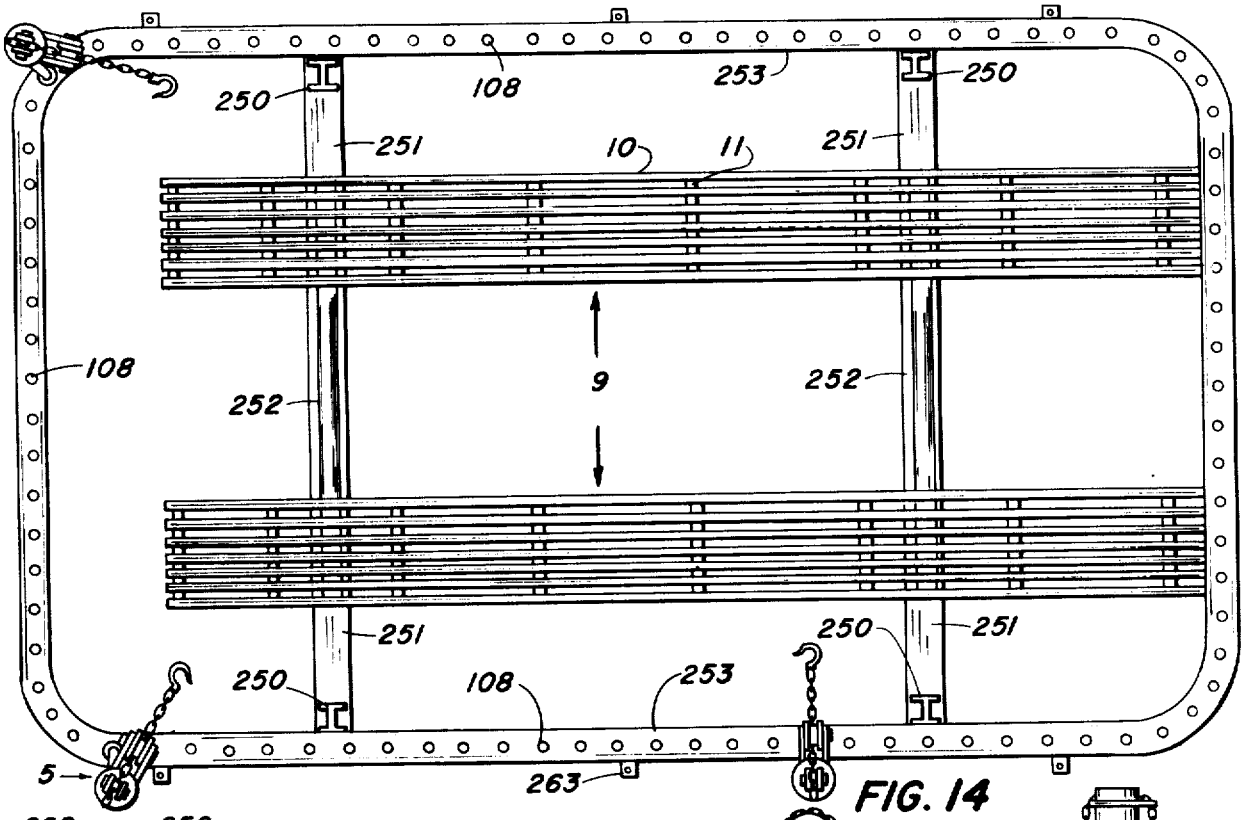
Figure 15:
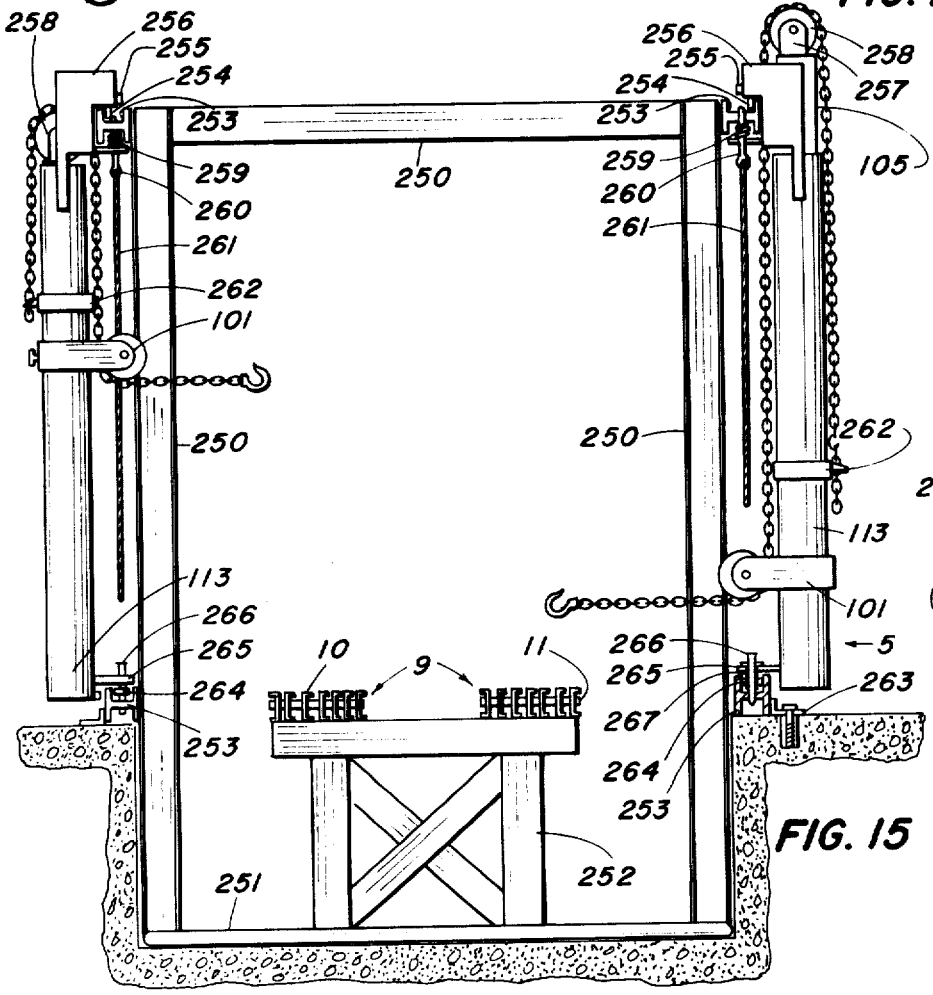
Figure 13:
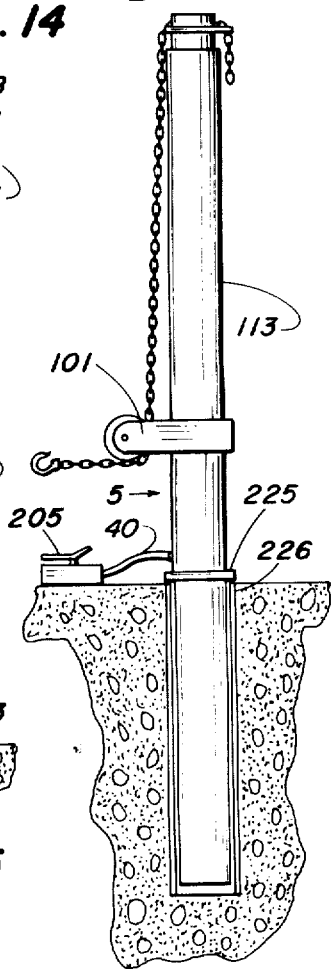

FIG. 6, is a top view of another embodiment indicating how radially positioned towers are used with their respective rails or ramps which are secured to building floors and/or to other tower and ramp subassemblies to provide many, but not all, of the operational advantages of the embodiment of FIG. 1;

FIGS. 7 and 8, partial top views, indicates how towers shown in FIG. 6 used with their respective rails or ramps, which are movable or retractable casters, are conveniently positioned to apply restorative forces;

FIG. 9 is a partial elevational view of the embodiment of FIG. 6, with some portions removed, illustrating the semipermanent longitudinal floor mounting of one tower and ramp or rail subassembly and a movable cross-positioned tower and ramp or rail subassembly;

FIG. 10 is a partial elevational view, with most positions shown in section, indicating multiple radial positioning and securing of the tower shown in FIG. 6 with respect to its associated ramp or rail;

FIG. 11 is a plan view of how a tower shown in FIG. 6 with its caster supported ramp or rails is combined with wheel alignment ramp or rails to increase the capacity of such alignment apparatus by providing easily adjustable restorative force equipment with it, making the resulting overall apparatus very useful in accurately and quickly returning all portions of a vehicle frame to their original specified relative locations;

FIG. 12 is a partial side elevational view of the combined tower, its ramp or rails, and alignment ramp or rails as shown in plan view in FIG. 11, indicating how the tower is conveniently moved into position;

FIG. 13 is an elevational view, partially in section, indicating how a separate tower or a pedestal may be removably and rotatably placed in a ground or floor sleeve;

FIG. 14 is a plan view of a different embodiment of towers, equipped with other adjustment components and guide rail riding accessories to travel about a track positioned where a vehicle is to be repaired; and FIG. 15 is an elevational view, partially in section, indicating how an embodiment of FIG. 14 is specifically arranged with an overhead guide rail for moving the towers, where positioning rails or ramps are supported in a pit structure to receive a damaged vehicle.

Figure 16:
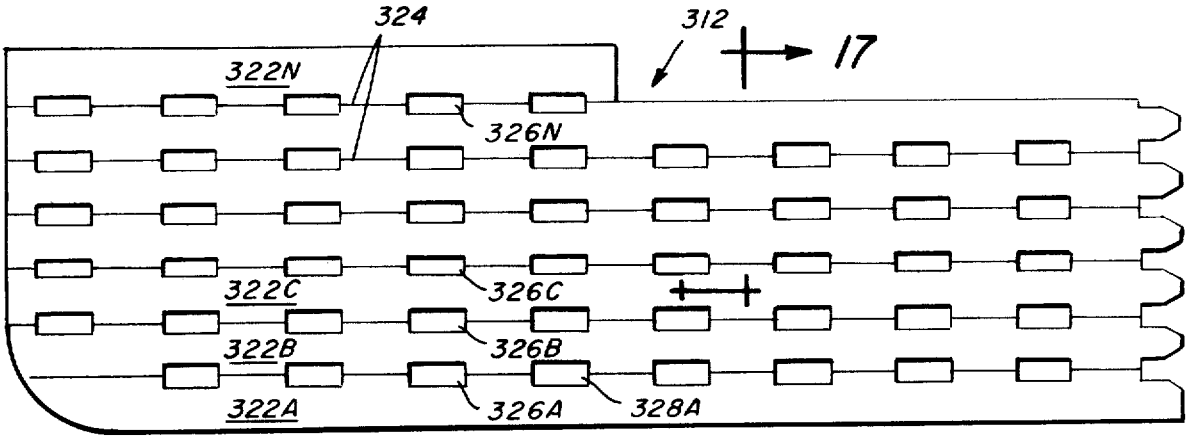

[FIG. 16 is a plan view of a preferred embodiment of the treadways of FIG. 3.]

Figure 17:
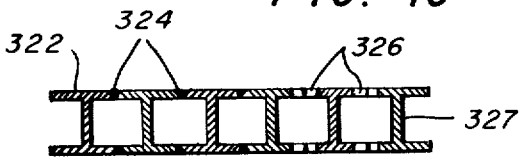

[FIG. 17 is a cross sectional view taken along the line 17—17 of FIG. 16.]

[FIGS. 18, 19, 20, and 21 shown alternative construction for the treadway of FIG. 16.]

Figure 22A:
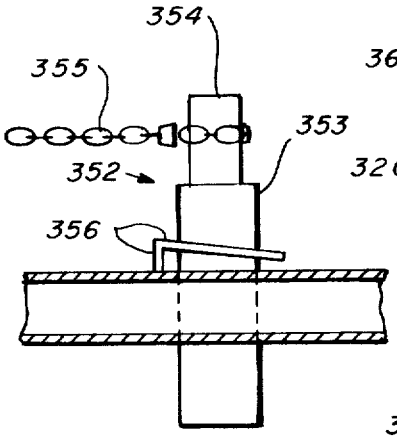
Figure 22B:
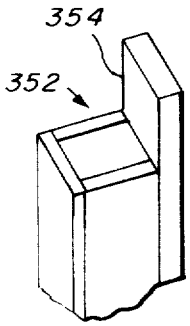

[FIGS. 22A and 22B illustrate the type of holding device by means of which a tension or compression force can be applied to the platform assembly.]

Figure 23A:
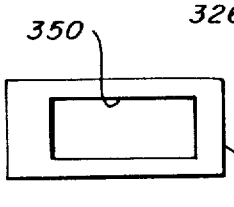
Figure 23B:
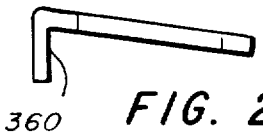

[FIGS. 23A and 23B are plan and elevation views respectively of a small fastening device by means of which the embodiment of FIG. 22 can be positioned at any height in the platform assembly.]

DESCRIPTION OF PREFERRED EMBODIMENTS

Introduction to all Embodiments

Throughout all embodiments, the purpose is to provide apparatus that is quickly, safely and conveniently utilized to create one or more restorative forces which create, in reverse, the forces originally causing damage and/or misalignment. The embodiments of apparatus are offered to meet the operational and economic specifications of all persons so engaged in various sized shops as a part of the overall automotive servicing industry.

Figure 2:
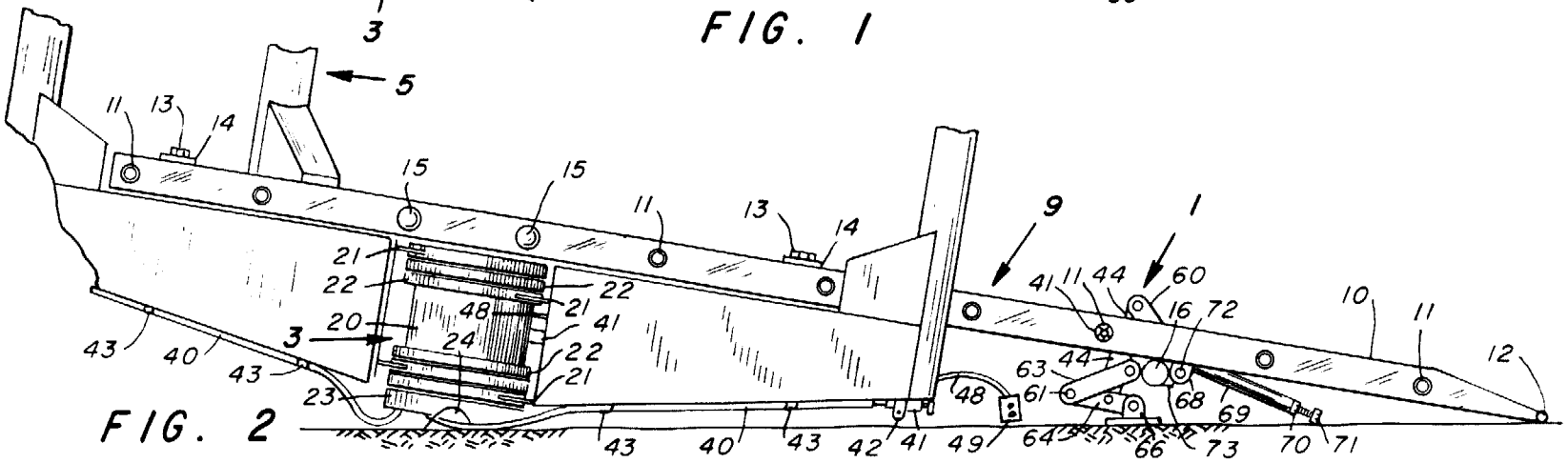
FIG. 2, is a partial side elevation of the embodiment shown in FIG. 1 positioned to receive a vehicle which is electively either driven forward on to the apparatus or backed on depending on where and how the vehicle is damaged.

In shops that do a large volume of frame and body alignments and an occasional front end alignment, the machine shown in FIGS. 1, 2, and 3 is ideal. For shops that are limited for space, finances or both, that desire to have the convenience of their own frame equipment, the machine shown in FIG. 6 is very suitable. In shops of all sizes the portable machine in FIGS. 7 and 12 is ideal for smaller alignment jobs that do not need to be placed on the heavier frame equipment. If shops do a large volume of front-end alignments and an occasional frame and body alignment job, the machine in FIG. 11 is ideal. When the Unit 200 is not needed on the front-end machine, it is used as a portable frame and body alignment machine on smaller jobs that do not need to go on the rack. When one or more of these 200 units are united as shown in FIG. 11, you have a complete body and frame alignment system, capable of handling major frame and body alignment jobs. FIG. 14 shows another type of machine for large or specialized shops, utilizing the invention features for greater economy and better tie-downs. In shops pushing for maximum volumes, the tower subassembly shown in FIG. 13 is very handy. These pull towers are installed in strategic locations all over the shop, for quick and easy pulls when needed.

In respect to all these embodiments, most of the following objectives are met: installation is made within a normal one stall area without altering a building or without requiring any special wiring or plumbing beyond a standard electrical plug and a compressed air outlet; a vehicle is tied down, pushed or pulled at any angle or height, with ample power to bend any part of the vehicle without the use of heat or time consuming, back-breaking labor; all hookups are made, including many tie-down hookups, by an operator from a standing position, without lifting any heavy, awkward handling attachments or having to climb over or under any supporting beams; any good body man can operate the apparatus without receiving an extensive amount of instruction, the apparatus does not become a permanently fixed part of the building, once it is installed; the apparatus does not require handling of heavy jacks or components; the apparatus is capable of pushing or pulling from one direction or several directions at one time; the apparatus is designed to eliminate practically all physical strenuous lifting stooping and squatting labor; operational capabilities of the apparatus is limited only by the operator's imagination; the apparatus is capable of applying power from exactly the same angle of least resistance; the apparatus is simple enough to use throughout the range from a minor bumper alignment job to a major frame and body alignment job; the apparatus is used for front end alignments; etc.

In reference to using the apparatus of most embodiments, procedures followed are: position a vehicle on or near the apparatus oriented so the maximum of damaged portions of the vehicle is adjacent the range of multiple positions of the towers and then tie or secure the vehicle to the rails or ramps; move towers to the desired angular positions and secure them to the rails or ramps; place hooks and/or clamps of the respective chains or other tensioning members to the damaged portions of the vehicle and position the elevation determining accessories to guide these tensioning members as they are passed on to the respective tops of the towers for securing there or over and back down to a more convenient securing location; and operate the controls to elongate the towers creating the restorative forces used in pulling out the damaged vehicle components to their original or near original design relative locations.

Embodiment Shown in FIGS. 1 through 5, Elongatable Towers Radially Adjusted About a Pedestal to Inclinable Hold Down Ramps In FIG. 1, a vehicle or car is shown positioned on the apparatus or machine using a selected few hookups from among many that are available. Regardless of where the damage is on the vehicle or in what direction the damage occurred, it is possible to pull it back in line from the same angle the damage occurred. By pulling at the damage from the same angle as the point of impact, the metals have much less resistance, permitting a much faster, more accurate alignment job, almost completely eliminating the use of heat, for straightening of critical parts, avoiding changes in the temper in metals causing weak spots or breakage.

The three pull towers 5 are adjustable to pull from any direction desired. To move any tower, simply unscrew bolt 13 (See FIG. 4), push tower around to the desired angle and reinstall bolt 13 and plate 14. Hook pull chain to damaged area and hookup is complete. With three pull towers adjustable to pull at any height or angle, the frame and body of the damaged vehicle are all pulled back into alignment in the same operation, rather than pulling one and then the other, by pulling both the frame and body at just the right angle and height. Such pulling cuts down on the resistance, resulting in a much faster and better job. Construction of these pull towers allows the use of much larger and longer actuating cylinders, that do not have to be handled by hand.

SUBSECTION A shows the tie-down at front of car. SUBSECTION B shows the tie-down further back on car. SUBSECTION C shows the tie-down for pulling from the pull towers. While pull tower movement is stretching frame, auxiliary jack [44] *45* applies pressure upwardly to the frame.

The series of cross-members in each rail 9 provides a ready place for tie-downs at any angle or point on the rails 9, regardless of angle desired, as shown in SUBSECTIONS A, B, & C. Also there is no problem finding a spot to set jacks 45 on rail assembly 9, for pushing up on body or frame or both, as shown in SUBSECTION D.

The entire machine is mounted on a pedestal 3, hinged from the floor and secured by lag-screws. The pedestal 3 is also an axis for the pull towers 5, permitting the towers 5 to be positioned for pulls from any desired angle. The hydraulic pump 55 is mounted inside the pedestal 3, for both protection and convenience. Pump 55 is activated by remote control 49. Pump 55 is easily removable from pedestal 3 for servicing.

In FIG. 2, the apparatus or machine, is shown lowered at one end completely tilting it to receive a vehicle, not shown without using removable ramps. In order to lower it, a safety stand 69 must first be pulled and pivoted from its upright position which is automatically taken when the apparatus is tilted back up to its horizontal position. In such elevated horizontal position, any vehicle raised by the apparatus is sufficiently high so no pit volume in the building is needed below the vehicle being repaired.

In FIG. 3, the apparatus or machine, is shown in a top view to illustrate the almost unlimited number or tie-down or anchoring locations available along rail assemblies 9. Also indicated are the multiple radial positions of the pull towers 5. As shown, the towers 5 are applying power in three different directions at one time. Also, the auxiliary jack 45 is pushing on a short link in the frame of the vehicle forcing it to bend in the desired location or spot. There is no lost time or heavy lifting in making hookups, since the pull towers 5 stay rigged for action at all times. The auxiliary cylinder 45 is a standard 10-ton body jack, hooked into the hydraulic system on the machine to be used as shown in SUBSECTION D and FIG. 3.

Rail assemblies 9 consists or a series of single beams 10 on edge, welded to a series of cross-members 11. The two rail assemblies are mounted on two main cross-members 15 which are welded to the pedestal 3, and they are also mounted on one cross-member 16 at the rear of the machine. The lift device is also fastened to the rear cross-member 16. The advantage of fabricating the rail assemblies 9 in this manner is the creation of spaces between the beams and regular spacings of cross-members 11, making it a very simple operation to tie any vehicle to a rail assembly 9, regardless of angle or location required by each repair job.

Throughout the utilization of all apparatus of the various embodiments, special body clamps are provided and often used. Some cars do not have frames and it is very difficult at times to find a place suitable for tying the car down, in order to pull as hard as necessary at times, without causing damage to an undamaged part of the car. However, usually on a unitized body, there is a small flange on the lower part of the body sill, that is a suitable tie-down location, provided you have clamps capable of holding on to this small flange. These clamps of FIGS. 3A, 3B, and 3C are designed for this purpose and they are very simple to use. The clamp, placed in position, bolt 152 and nut 153 are tightened snugly to hold clamp unitl pressure is applied. The chain is hooked in the space provided in part 150 and, as pressure is applied, part 150 slips back on parts 151, sinking teeth into the body flange. The harder the pull, the tighter the squeeze. It will not slip.

In FIGS. 4 and 4C, portions are broken away to indicate construction of pull tower asemblies 5, pedestal assemblies 3, the hydraulic system leading to and departing from hydraulic pump 55, and the locking devices 13/111 to keep pull towers 5 in their respective selected radial positions. There are two pull tower lock systems shown. The pin system 111, is the most desirable of the two. The hydraulic cylinder 57, etc., is tucked inside the pull tower poles 113. This enables the use of large, long cylinders and leaves the hookup ready to use at all times without any handling of jacks, heavy attachments, etc. The only setting up required is to adjust the height of pull and angle, merely by setting idler assembly 101 to the desired spot on the pull tower pole 113. This pull tower pole may be attached to many other types of frame machines not shown improving them considerably and it may be mounted in the floor of a shop to provide a ready pull facility when needed on minor body repair jobs.

In FIGS. 4 and 4A and in all embodiments, an idler assembly 101 for each pull tower 113 is adjustable to any desired height and angle. Set screw 124 holds idler assembly 101 at the desired location until pressure from cylinder 57 is applied. As chain 102 is pulled, a resulting upward force on one side of idler assembly 101 creates a binding action between it and tower pole 113. The harder the pull, the tighter this gripping or binding action becomes thereby holding idler assembly 101 at the proper height and angle throughout the entire pulling operation utilized to pull out damaged portions of a vehicle.

In FIGS. 4 and 4B, the hydraulic system is illustrated. After a vehicle is in place, the lift assembly shown in FIG. 5, is raised to that position as a valve type 41 located adjacent to it is opened. After the apparatus or machine is leveled, this valve is closed. Thereafter, other valves 41 controlling fluid flow to other cylinders are selectively opened and closed to cause movement under pressure while adjustments are made to others. One or more hydraulic cylinders may be regulated while keeping pressure on all thoses that previously received hydraulic liquid under pressure. A central pump 55, driven by an electrical motor or a compressed air motor, selectively supplies hydraulic fluid under pressure through these various valves 41 to actuators 44, 45 and those actuators referred to as pull tower cylinders 57.

Although a hydraulic system is shown and described, compressed air actuators and mechanical actuators may also be used.

In regard to this embodiment presented in FIGS. 1 through 5, the following numerals identify the following parts in reference to the specific groupings indicated:

Hydraulic Components and Related Components

40 Hydraulic hose to pull towers; 41 Control Valves; 42 Bracket fastens control valve to machine; 42 Clips to secure hydraulic hose; 44 hydraulic cylinder, operating lift apparatus; 45 auxiliary jack, coupled into the hydraulic system; 46 Nipple (body jack); 47 attachments (body jack); 48 Remote control line; 49 remote control switch; 50 Body jack attachments; 51 Hydraulic hose to lift cylinder; 52 Hydraulic hose to auxiliary body jack; 53 Hydraulic line junction box; 54 hydraulic hose to pump assembly; 55 Hydraulic pump (air driven or electric); 56 Plate supporting pump assembly and junction box; and 57 pull tower cylinder.

Lift and Stand Assembly—1

60 Bracket holding Hydraulic Cylinder 44; 61 Pins; 62 Brackets; 63 Upper arms; 64 Lower arms; 65 Shaft (cylinder pushes on this shaft to raise machine); 66 Mounting bracket (fastened to floor); 67 Mounting bracket leg screws (fastens lift assembly to floor); 68 Bracket; 69 Leg stand; 70 Jam nut; 71 Leg Bolt; 72 Shaft; 73 Stop; and 74 Brace.

Tie-Down Attachments

80 Tie-down or pull hook with chain hook slot for fast chain adjustment; 81 Tie-down chain; 83 Tie-down or pull hook; 83 Tie-down or pull hook; 84 Pull plates; 85 Shackles with chain hook slots (for fast adjustments) 86 Bolts (usually bumper bolts); 87 Chain hooks.

Pull Tower Assembly 5

101 Idler assembly; 102 Pull chains; 103 Upper push rod cap with chain hook slot for chain adjustments; 104 Guide flange for holding pull chain in center of Push rod; 105 push rod (Movable up and down and will turn 360°) 106 weld on pull plate; 107 Pull chain hook; 108 Holes for bolts or pins (for hooking pull towers into position) 109 Sleeve (used with pins 111); 110 Nut (if bolts 13 are used); 111 Pin for securing pull tower; 112 Spacer flange secured to pin 111; 113 pull tower pole; 114 Upper part of pull tower pole brace; 115 Gussets (pull tower pole Brace) 116 Bar (welded inside of pull tower pole 113); 117 Flange (secured to cylinder 57 to keep cylinder centered); 118 Lower push rod cap; 119 Upper part of pull tower beam; 120 Lower part of pull tower beam; 121 Inner brace (pull tower beam welded to 119–120–122 and 122 End plate (Pull tower beam).

Idler Assembly 101

123 Collar; 124 Thumb set screw; 125 Pin; 126 Bracket; 127 Idler pulley; and 128 Brace.

Rail Assembly 9

10 Beams in main rails; 11 Cross-members in rails; 12 End cross members; 13 Anchor bolts or pins to secure pull tower to rails; 14 Plate or washers under bolts 13; 15 Main cross members, supporting rails, welded to pedestal; 16 Rear cross member, supporting rail assembly lift device; 17 upper section of cross member 16; and 18 Movable cross member, (Movable between rails).

Pedestal Assembly 3

20 Pedestal; 21 Bracket; 22 Collar; 23 Flange collar, welded to Pedestal 20; 24 Mounting bracket; 25 Mounting Shaft, welded to Pedestal 20 and Flange 23; and 26 Door (Pump assembly lifts out through this door for service).

Body Clamps

150 Clamp housing can be fabricated or forged; 151 Wedges with teeth attached; 152 Bolt; and 153 Nut.

Car Body B

Car Frame F

Other Embodiments Based on Pedestal Radially Adjusted Elongatable Towers of FIGS. 1 through 5.

Although FIGS. 1 and 2 shown one central pedestal 20, two pedestals one on each side of a vehicle location may be used. Also one pedestal at the front and one at the back of each vehicle location may be used. Such arrangements are dependent on the requirement for even greater convenience in effecting repairs. Where more pedestals are to be used generally additional facilities such as pits or ramps are included in the overall building.

Embodiments Shown in FIGS. 6 through 12, Elongatable Towers Radially Adjusted About a Pivot Pin Mounting Secured to Either a Fixed Position Hold Down Ramp or a Movable Hold Down Ramp and Used Together As first observed in FIG. 6, as assembly 175 is preferably installed in the center of a bay of a body shop and secured to the floor provide an embodiment of the invention at a lower cost but retaining many of the features. If damage is on left side of car, the car is driven on assembly 175 as shown in FIG. 6. If damage is on the right side of car, the right side of the car is placed on the assembly 175. The pull tower on assembly 175 is movable as indicated, allowing pulls from several angles. There are unlimited tie-down spaces on rail assembly, Regardless of the shape of a frame or body, there is a tie-down space in the rail that will line up, to pull straight on the car or frame or in any angle desired. By tying a car to the rails in the desired spots and thereafter operating the pull towers and their hydraulic systems repairs are commenced.

When assembly 200 is used with assembly 175, you have a very versatile frame and body alignment machine, enabling pulls from any point around the vehicle at heights desired. Assembly 200 is movable along assembly 175 as indicated in FIG. 6. Also, assembly 200 is used on the opposite side of assembly 175, as shown in FIG. 8. By using assemblies 175 and 200 it is possible to pull at any point completely around the vehicle. In FIG. 7 asembly 200 is being used as a portable apparatus or machine, movable to any other stall or location desired. The pull tower on assembly 200 is also movable, as indicated, making it possible to pull at several angles without resetting the machine. When using unit 200 as a portable, the weight of the car is placed directly on the machine to rest firmly on blocks 203 that are then directly on the floor.

There are many advantages gained in using this portable unit 200, such as the operation of movable pull tower, the wide variety of tie-down spaces available, and the way the weight of the car is directly on the machine, holding it much more firmly in place throughout the pulling operation. Also, a detachable or sliding extension can be added to the rail assembly, if desired. In FIG. 8, the assembly 200 is being used on opposite side of assembly 175. In FIG. 9, unit 200 is rolled under assembly 175 using the caster assembly. In FIG. 10, portions are cut away to view the construction of the pull tower beams, which are fabricated to fit on both sides of rail 9, to prevent any twist when making angle pulls.

In FIG. 11, a front-end alignment machine is indicated in part to illustrate how one or more portable assemblies or units 200 are used to create a better front-end alignment machine. It is also then a very good frame and body alignment machine, and also often a very fine portable frame machine. For shops growing in business and capital, the machine and/or apparatus shown in FIG. 11 may be purchased, for example, in three orders over a reasonable period of time. As additional portable assemblies or units 200 are purchased, they are also conveniently rolled under portions of a front-end machine, as illustrated in FIG. 12.

Embodiment Shown in FIG. 13, Pull Towers Secured to Shop Floors and Yards

On many occasions it is very desirable to have a ready pull tower for quick, easy pulls to align fender, hoods, bumpers, inner panels and frame horns, that normally would be too small to place on a frame rack or go to a lot of trouble rigging up a portable machine or body jacks. For maximum efficiency for these small alignment jobs, pull towers, as shown in FIG. 13, are mounted in the floor in strategic positions in each stall. When used with some well secured floor anchor plates, it is possible to align major body and frame alignment jobs with these pull towers. When sleeves 226 are embedded in shop floor, pull tower assembly can be moved from one location to another. Also, these pull towers could be positioned in the yards of shops.

Embodiments Shown in FIGS. 14 and 15, Pull Towers Movably Secured to Rails, Etc.

Where a high volume of severely damaged vehicles are being repaired, the embodiments shown in FIGS. 14 and 15 are used. Pull towers are moved about on guiding rails that encircle the working bay area. A pit may and may not be used. Where pull towers are high, tension members, such as chains, are guided over their tops through idlers 258 and down again for securing in chain slots on collars 262. These collars 262 bind on posts 113 when hydraulic pressure created forces cause upward tower movements.

Additional Parts Used in Assemblies 175 and 200

176 Bracket, securing assembly 175 to floor, two required; 201 Pin, securing pull tower assembly to rail assembly; 202 Caster assembly; 203 Blocks, to support machine when Casters are compressed; 204 Stop, adjustable along top side of rail assembly, not needed except when Unit 175 and 200 are used together; 205 any suitable pump assembly; 206 Pin, securing upper and lower rail assemblies when used together; 207 Caster Bracket; 208 Caster spring; 209 Caster spring housing; 210 Stop or washer; 211 Caster Wheel and Fork Assembly; 212 Bushing; 215 Upper plate; pull tower beam; 216 Gusset; 217 Center plate, pull tower beam; 218 Lower plate, pull tower beam; 220 Front-end alignment turn tables; 221 Bracket assembly supporting machine; 225 Flange or stop; 226 Sleeve embedded in floor; 250 Structural frame assembly; 251 Lower Support Bar; 252 Rail support assembly; 253 Upper and Lower track assemblies; 254 Upper roller; 225 Upper roller pin; 256 Upper pull tower bracket; 257 Push rod Idler bracket; 258 Push rod idler; 259 Lock pin spring; 260 Lock pin; 261 Lock pin pull rope; 262 Pull chain adjustment collar; 263 Anchor Brackets; 264 Lower rollers; 265 Lower pull tower bracket; 266 Lower lock pin; and 267 Lower roller bushing.

SUMMARY OF ADVANTAGES

The apparatus selected in one or more of its embodiments performs the versatile function of pulling damaged parts in directions reversed from those causing such damage. The metals, without heating, are pulled back to their originally specified relative locations or at least within the original factory designated tolerances. Depending on the volume and nature of jobs to be undertaken in a shop, the apparatus may be increased in size, function and capacity with added components being adaptable with no change or minor changes to previously acquired apparatus.

Throughout all components, the utilization of the pulling towers and their conveniently arranged selective positioning and hold-down accessories, results in quick and accurate setups requiring no lifting nor awkward stances or manipulations on the part of anyone in a shop who is repairing a vehicle.

[DESCRIPTION OF ADDITIONAL EMBODIMENTS]

[FIG. 16 illustrates in plan view an improved embodiment of the treadways of the platform system of FIG. 3. It is comprised of a plurality of longitudinal elements 322A, 322B, 322C . . . 322N. These are attached in side-by-side parallel arrangements so as to provide a top and a bottom surface member, both of which are plane and parallel to each other, with a corresponding plurality of vertical supports or ribs, supporting the spaced apart surface members. There are a plurality of openings 326A, 326B, 326C . . . 326N in a two-dimensional array of positions. These generally comprise rectangular openings in the top surface member and the bottom surface member, whereby the pairs of openings are in alignment along an axis perpendicular to the surface of the treadway. While rectangular openings have been illustrated, it will be clear that circular openings can equally well be used. The purpose of these openings will be explained more fully in relation to FIG. 22A.]

[The principle improvement of this invention lies in the use of a plane, rigid platform, composed of two treadways upon which a vehicle can be placed in order to be operated on by the force-application apparatus of this invention. The important part is that all forces applied to the object (or vehicle) are applied between the vehicle and the platform system. The system is designed to be sufficiently rigid so that no other anchoring means for forces applied to the vehicle are required. The treadways are designed not only to support the vehicle but also to provide a plurality of openings by means of which hooks, fixtures, rods, etc., can be quickly inserted into or removed from any one of the plurality of openings to provide anchoring means through which forces can be applied between the vehicle and the treadways.] Although various means of applying forces, such as hydraulic rams, etc., can be used, an important part of this invention encompasses the use of the vertical pull towers which are attached to the platform system by means of arms which are pivotally connected to the system, so that the tower can be swung into various positions and locked therein so that the direction of application of the pulling force of the tower can be adjusted as desired.

[The essential feature of the treadways is that they be plane and rigid and have a multitude of openings, the axis of which are perpendicular to the plane of the treadway. The construction can be one of many. For example, FIG. 17 illustrates one way in which the treadway can be constructed. It shows a cross section across one treadway taken along the line 17—17 of FIG. 16. There are a plurality of I beams 322A, 322B, . . . 322N which are placed in longitudinal parallel contiguous positions and are welded along their touching edges 324 to provide a rigid slab construction which comprises an upper surface 323 and a lower surface 325 which are both plane and parallel to each other and spaced apart by the width of the central ribs of the I beams. Either before or after the I beams are welded to form the treadway, rectangular openings 326A, 326B, 326C . . . 326N are cut into the flanges of the I beams, one-half out of each of the adjacent flanges. As shown in FIG. 16, when the I beams are welded together along the edges 324 the line of the edges will be a center line for the opening 326.]

[The use of the I beams to provide not only the stiffening ribs but also the top and bottom surfaces, which form the treadway as shown in FIG. 17, is a preferred embodiment. However, it is possible also as shown in FIGS. 18, 19, 20, and 21 to construct a rigid treadway by other means.]

Figure 18:
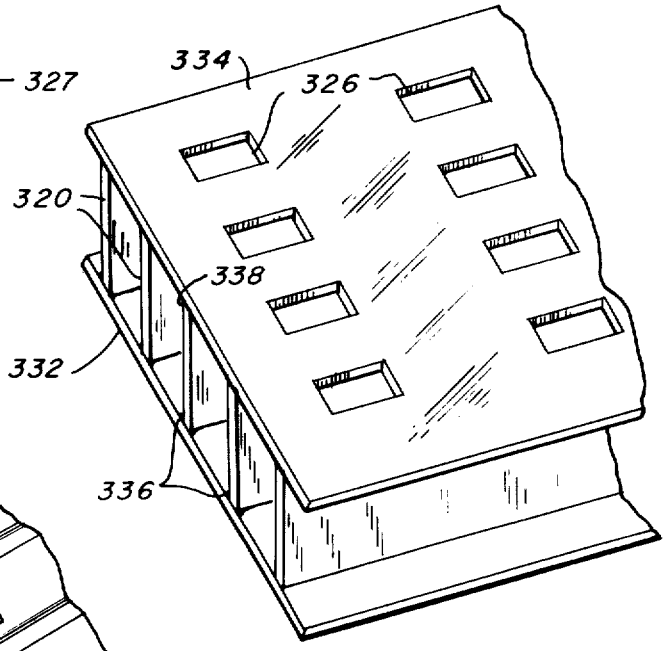

[Referring now to FIG. 18 the treadway can be constructed by using separate steel plates 332 and 334 which are spaced apart and attached to longitudinal vertical metal strips 330 such as by welds 336 and 338. Prior to assembly, the openings 326 are cut into the two plates 332 and 334, such as, for example, by superimposing the two plates and by means of a torch burning through the two plates to form rectangular openings 326. Of course, these openings can be rectangular or circular. Also they can be punched through the plates as is well known in the art. The vertical spacing-ribs 330 are then welded to the bottom plate such as 336. The assembly is then turned over on top of a top plate and the ribs 330 are then welded to the plate 334 producing welds such as 38. In this case the welding rod can be applied through the openings 326 to apply the welds between the vertical strips and the plates 334.]

Figure 19:
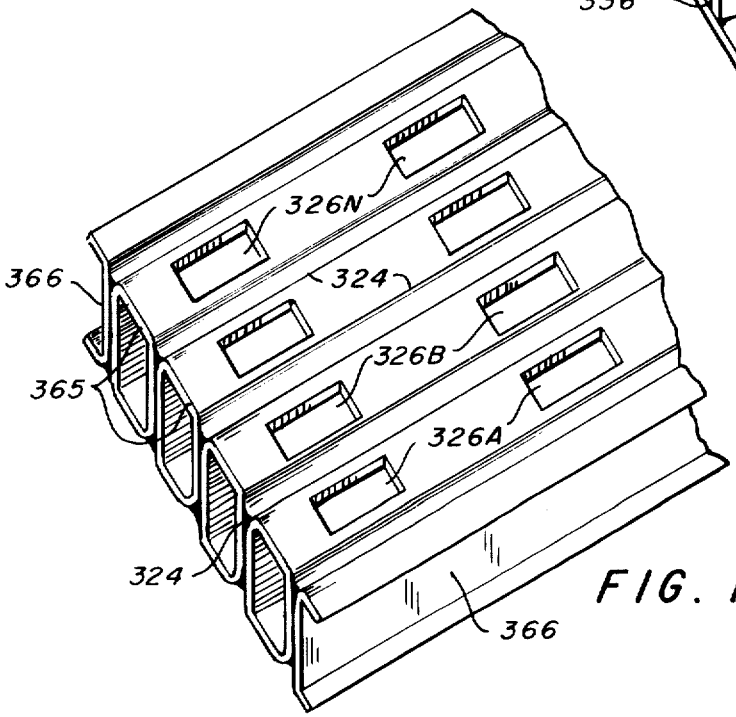

[FIG. 19 represents another embodiment of the construction of the treadway of FIG. 16. This utilizes a plurality of rectangular tubes 365 placed in a longitudinal, parallel, contiguous relation with two channels 366 one on either side, all welded together along the corners 324. This construction not only provides the top and bottom surfaces but also provides a large number of perpendicular ribs to provide the stiffening required. In this case, the openings 326 are cut through the top and bottom surfaces of the rectangular channels.]

Figure 20:
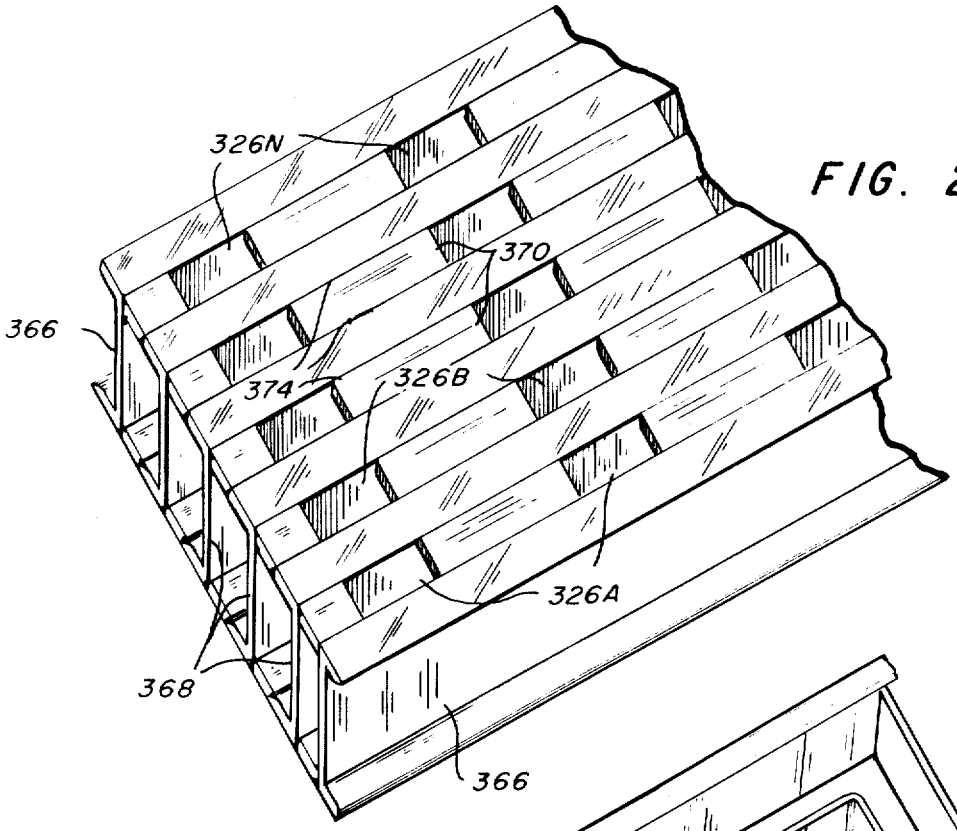

[FIG. 20 illustrates still another construction in which a plurality of steel channel sections 368 are placed parallel to each other and spaced apart. Short rectangular blocks 370 are placed between the flanges of the channels 368 and the two end channels 336 so as to provide openings 326A, 326B, . . . 326N between the flanges of the channels for a selected length. The small blocks 370 are welded to the flanges of the channels along the edges 374, as indicated.]

Figure 21:
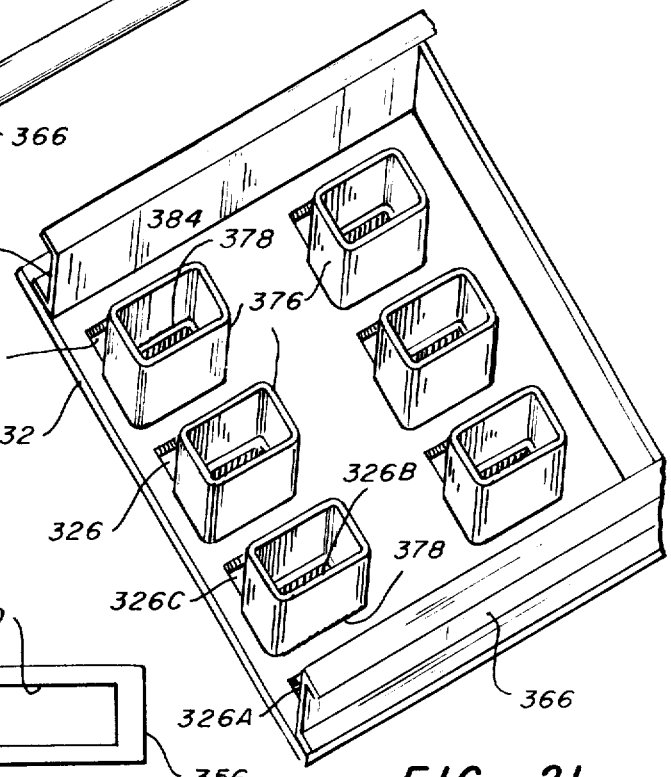

[FIG. 21 shows still another embodiment of the construction of the treadway of FIG. 16. This uses a top and bottom plate (only the bottom of which, 332 is shown). Two angle sections 366 are used as in FIGS. 19 and 20. Openings 326 are cut into the bottom plate 332 as in FIG. 18 and short lengths of tubing 376 are placed over all or part of the openings 326, and are welded to the plate 332 as in FIG. 18. The internal dimensions of the rectangular tubing is somewhat larger than the size of the openings 326 so that a hook or other device can be inserted into the opening and have a lip against which it can pull, without interfering with the tubing section welded around the opening. After the portions of tubing 376 are welded to the plate 332 as are the longitudinal channel sections 366, the top plate is placed over the assembly and the openings 326 which have previously been prepared in the top plate are lined up vertically with the openings 326 in the bottom plate and the assembly is clamped together, turned over, and the top plate is then welded to the second ends of the tubing sections.]

[It will be clear that there are a number of ways in which a rigid plane treadway system can be designed and constructed. It is important that whichever way is used that there be sufficient rigidity so that the maximum forces which will be applied to the treadway will not cause it to buckle or bend. Furthermore, the plurality of openings in the top and bottom surfaces are utilized in several different ways for the application of forces. In one way chains can be linked down one opening and up adjacent opening to provide a strong anchor to the treadway. In other ways the chains or cables can be attached to hooks which are inserted into the openings and a third and important way in which the openings can be utilized for anchoring purposes is illustrated in FIGS. 22A, and 22B.]

[As shown in FIG. 22A, a post which may be a solid rectangular construction or a rectangular tubular construction of appropriate dimensions, so as to freely be inserted into the plurality of openings 326 in the treadway can be used to apply compression or tension forces to the vehicle or object to be worked on.]

[These posts 352 are inserted through the two openings in the top and bottom surfaces of the treadway and are held in any desired vertical position by means of a locking clip 356. This is illustrated or in more detail in FIGS. 23A and 23B. It comprises a rectangular opening 350 in a strip 356, which is slightly larger than the size of the post 352 so it can easily slip up and down on the post. It has a short leg 360 bent substantially at right angles, so that when the post is in the proper position and the clip can be slipped over the post and pressed down till the leg 360 contacts the top surface. Further movement downward of the post causes it to bind with the clip and be held in that position without dropping further through the opening. The rectangular tubular post 352 can be made long enough so that it can reach upwardly to press against a bar frame, axle, or other portion of the frame of the vehicle. It is possible also to make one edge 354 of the rectangular tube extend upward beyond the top of the tubing 352 so that it can reach up into narrow gaps between portions of the vehicle to apply the force that is required. Alternatively, bars of various cross sections can be inserted into the tubing 352 to extend them to greater heights so that they may press directly against the vehicle or serve to anchor a chain so that a pull can be made against the bar 352, and from the bar to the treadway.]

It will be clear that by the use of the rigid platform system of this invention the two or more opposing forces which are to be applied to the object or vehicle on the platform are both anchored to portions of the platform system. These may be inherent portions such as the openings through the treadways. They may be other portions of the platform system, such as the vertical pull towers which are attached in a pivotal manner. They may be still other structure, such as frames to which are pivotally attached vertical pull towers, these frames being removably attached as desired, to the platform system. One such removably attachable device is illustrated in FIG. 12. This is a frame supported on casters which can be maneuvered into position under the platform and bolted thereto, the frame supporting a vertical pull tower. A pulling force can be applied between the object and the pull tower, which force is directly connected back from the pull tower, through the movable substructure to the platform system. It is clear also that the vertical pull towers which are pivoted to the platform system can be pivotally attached to a central pedestal 20 of FIG. 1, if there is one, or to the treadways as in FIG. 6, or to cross members as in FIG. 6, or to removably attachable members as in FIG. 12. The important point is that during the pulling operation all forces are anchored directly or indirectly to the platform system. The platform system may include permanently attached parts, and removably attached parts, which, for the purpose of pulling are clamped to and are part of the platform system.

While the invention has been described with a certain degree of particularity, it is manifest that many changes may be made in the details of construction and the arrangement of components it is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. Apparatus for applying equal and opposite forces to a mechanical structure such as an automotive vehicle body or frame comprising:

a. a platform system;

b. means on said platform system for supporting said structure;

c. at least one vertical pull tower means pivotally connected about a vertical axis fixed to said platform system rotatably moveable to a desired position relative to said structure;

d. means to vertically elongate said tower;

e. means to connect a tension member between said vertically elongate means and a first portion of said structure to apply a first force to said structure; and f. means to apply a second force between a second portion of said structure and said platform system.

2. The apparatus as in claim 1 in which said platform system includes at least one treadway on which said structure is supported.

[3. The apparatus as in claim 2 in which said treadway comprises a pair of plane, parallel spaced-apart plates, a plurality of spaced elements between, fastened to and supporting said plates, which comprise top and bottom members of said treadway.]

[4. The apparatus as in claim 3 and including a plurality of pairs of openings in said top and bottom member, each pair of openings in alignment perpendicular to the plane of said treadway.]

[5. The apparatus as in claim 4 including cylindrical rigid beam means removably received in said openings.]

6. The apparatus as in claim 2 including means to pivotally connect said pull tower to said treadway.

[7. The apparatus as in claim 1 in which said platform system includes a vertical pedestal, and including means to pivotally connect said pull tower to said pedestal.]

8. The apparatus as in claim 1 including means to lock said pull tower to said platform system in said desired position.

9. The apparatus as in claim 1 in which said platform system means includes means to support said at least one treadway substantially in a horizontal plane.

[10. The apparatus as in claim 6 in which said support means includes means by which said at least one treadway can be tilted so as to form a ramp to receive said structure.]

11. The apparatus as in claim 1 in which said structure comprises a wheeled vehicle.

12. The apparatus as in claim 1 in which said means to vertically elongate said tower is hydraulically actuable internally of said tower.

13. The apparatus as claim 1 in which tension member is a chain or cable.

14. The apparatus as in claim 1 in which said second force comprises a tensile force, and said apparatus includes tension means connected between said second portion and said platform system.

15. The apparatus as in claim 2 which said second force comprises a compression force [and said apparatus includes rigid means removably attached to said second portion of said structure to resist its motion under said first force].

[16. The apparatus as in claim 15 in which said rigid means comprises a cylindrical means removably received in any one of a plurality of vertical openings in said treadway.]

[17. The apparatus as in claim 15 including removable locking clip means to adjust the depth of insertion of said cylindrical means into said opening.]

18. The apparatus as in claim 2 including two treadways supported by a plurality of cross members in coplanar spaced-apart parallel relation.

[19. The apparatus as in claim 18 including a plurality of pairs of openings in said cross members.]

20. The apparatus as in claim 1 including independent frame means removably attached to said platform system, said pull tower means pivotally attached to said frame means.

[21. In an apparatus for applying equal and opposite forces to a mechanical structure including work platform and treadway means to support said structure, means to apply a plurality of forces between at least one point on said structure and said platform, the improvement wherein each of a pair of treadways comprises:

a. a pair of overlapping plane, parallel spaced-apart top and bottom plates;

b. a plurality of spaced elements between, fastened to and supporting said plates; and c. a plurality of pairs of openings in said top and bottom plates of said platform, said pairs of openings in alignment perpendicular to the plane of said platform.]

[22. The apparatus as in claim 21 in which said spaced elements include a plurality of spaced-apart, parallel, longitudinal members.]

[23. The apparatus as in claim 22 in which said longitudinal members comprise I beams in parallel spaced relation.]

[24. The apparatus as in claim 22 in which said longitudinal members comprise strips in parallel spaced relation, the planes of said strips perpendicular to said plates.]

[25. The apparatus as in claim 22 in which said longitudinal members comprise channels in parallel spaced relation.]

[26. The apparatus as in claim 22 in which said longitudinal members comprise rectangular tubes in parallel spaced relation.]

[27. The apparatus as in claim 21 in which said spaced elements comprise short lengths of cylinders in a two-dimensional array of positions over the area of said platform.]

[28. The apparatus as in claim 21 including rigid cylindrical beam means removably received in said openings.]

[29. The appartus as in claim 28 including removable locking clip means to adjust the depth of insertion of said beam means in said openings.]

[30. The apparatus as in claim 28 in which said beam means are tubular and including rod means removably received in the central opening therein.]

[31. The apparatus as in claim 21 in which said openings are rectangular in shape.]

[32. The apparatus as in claim 21 in which openings are circular in shape.]

33. Pull tower apparatus for use in a system for applying forces to a mechanical structure such as an automotive vehicle body or frame, comprising:

a. a vertically supported housing means comprising a cylindrical tube;

b. operating means comprising a cylindrical means reciprocably and rotatably received in said housing;

c. hydraulic actuator means inside said housing below said operating means, one of a cylinder and piston end of said actuator supported by said housing, the other of said cylinder and piston end of said actuator connected to the bottom end of said operating means;

d. a pull chain;

e. means connected to said operating means to receive said pull chain;

f. idler pulley means, to receive said chain, attached to a ring means slidably and rotatably surrounding said housing and including means to lock said ring means to said housing; and g. means to support said pull tower means in a vertical position.

34. The pull tower apparatus as in claim 33 in which said support means comprises vertical socket means in said system into which said housing is slidably received.

35. The pull tower apparatus as in claim 33 in which said support means comprises arm means hingedly supported by said system, said tower fastened to said arm means.

36. The pull tower apparatus of claim 33 in which said means connected to said operating means is an idler pulley and means to secure one end of said chain to said housing means.

* * * * *